United States Patent
Pfeifle

(10) Patent No.: US 11,157,531 B2
(45) Date of Patent: Oct. 26, 2021

(54) NAVIGATION DATA SOURCE INDICATING SPATIAL OCCUPANCY

(71) Applicant: HERE GLOBAL B.V., Eindhoven (NL)

(72) Inventor: Martin Pfeifle, Seewald (DE)

(73) Assignee: HERE GLOBAL B.V., Eindhoven (NL)

( * ) Notice: Subject to any disclaimer, the term of this patent is extended or adjusted under 35 U.S.C. 154(b) by 171 days.

(21) Appl. No.: 16/461,835

(22) PCT Filed: Nov. 17, 2016

(86) PCT No.: PCT/EP2016/078050
§ 371 (c)(1),
(2) Date: May 17, 2019

(87) PCT Pub. No.: WO2018/091096
PCT Pub. Date: May 24, 2018

(65) Prior Publication Data
US 2019/0370275 A1      Dec. 5, 2019

(51) Int. Cl.
*G06F 16/29*  (2019.01)
*G06T 7/11*  (2017.01)
(Continued)

(52) U.S. Cl.
CPC .......... *G06F 16/29* (2019.01); *G05D 1/0274* (2013.01); *G06F 16/2282* (2019.01);
(Continued)

(58) Field of Classification Search
CPC . G06F 16/2282; G06F 16/29; G06K 9/00791; G06K 9/00805; G05D 1/0238;
(Continued)

(56) References Cited

U.S. PATENT DOCUMENTS 6,021,406 A * 2/2000 Kuznetsov .......... G06F 16/5854
2011/0202539 A1 8/2011 Salemann
(Continued)

FOREIGN PATENT DOCUMENTS

EP       1160682 A1 * 12/2001 ......... G06F 16/9027

OTHER PUBLICATIONS

Yiu, Man Lung, Yufei Tao, and Nikos Mamoulis. "The B dual-Tree: indexing moving objects by space filling curves in the dual space." The VLDB Journal 17.3 (2008): 379-400. (Year: 2008).*
(Continued)

*Primary Examiner* — William Spieler
(74) *Attorney, Agent, or Firm* — Alston & Bird LLP

(57) ABSTRACT

A navigation data source is provided that includes an object data set including object data indicating a spatial vacancy and/or occupancy of sub-regions of a spatial region by one or more structural objects in the spatial region. The object data references the sub-regions based on a linear order of the sub-regions in the spatial region. The object data may include interval information about an at least partially occupied interval, such as a lower interval border and/or an upper interval border. The at least partially occupied interval indicates a group of, according to the linear order, one or more successional sub-regions, at least a part of which are spatially occupied. The object data includes an occupancy sequence indicating a spatial vacancy and/or occupancy of the successional sub-regions of the at least partially occupied interval.

30 Claims, 6 Drawing Sheets

(51) Int. Cl.
G06F 16/22 (2019.01)
G06K 9/00 (2006.01)
G05D 1/02 (2020.01)

(52) U.S. Cl.
CPC ............ *G06K 9/00805* (2013.01); *G06T 7/11* (2017.01); *G05D 2201/0212* (2013.01); *G05D 2201/0213* (2013.01)

(58) Field of Classification Search
CPC ........... G05D 1/024; G05D 2201/0212; G05D 2201/0213
See application file for complete search history.

(56) References Cited

U.S. PATENT DOCUMENTS

| | | | | |
|---|---|---|---|---|
| 2012/0179322 A1* | 7/2012 | Hennessy | ............ | G05D 1/0278 701/25 |
| 2017/0060944 A1* | 3/2017 | Khayyat | ............. | G06F 16/2282 |
| 2018/0059231 A1* | 3/2018 | Dewberry | ........... | G01S 13/0209 |

OTHER PUBLICATIONS

Adler, Benjamin, Junhao Xiao, and Jianwei Zhang. "Autonomous exploration of urban environments using unmanned aerial vehicles." Journal of Field Robotics 31.6 (2014): 912-939. (Year: 2014).*
Ramos, Fabio, and Lionel Ott. "Hilbert maps: scalable continuous occupancy mapping with stochastic gradient descent." The International Journal of Robotics Research 35.14 (2016): 1717-1730. (Year: 2016).*
Himmelsbach, Michael, et al. "LIDAR-based 3D object perception." Proceedings of 1st international workshop on cognition for technical systems. vol. 1. 2008. (Year: 2008).*
Doherty, Kevin, Jinkun Wang, and Brendan Englot. "Probabilistic map fusion for fast, incremental occupancy mapping with 3d hilbert maps." 2016 IEEE International Conference on Robotics and Automation (ICRA). IEEE, 2016. (Year: 2016).*
Chen, Yingfeng, Wei Shuai, and Xiaoping Chen. "A probabilistic, variable-resolution and effective quadtree representation for mapping of large environments." 2015 International Conference on Advanced Robotics (ICAR). IEEE, 2015. (Year: 2015).*
Li, You, and Yassine Ruichek. "Building variable resolution occupancy grid map from stereoscopic system—A quadtree based approach." 2013 IEEE Intelligent Vehicles Symposium (IV). IEEE, 2013. (Year: 2016).*
Wilhelms, Jane, and Allen Van Gelder. "Octrees for faster isosurface generation." ACM Transactions on Graphics (TOG) 11.3 (1992): 201-227. (Year: 1992).*
Labschütz, Matthias. An adaptive, hybrid data structure for sparse volume data on the GPU. Diss. Wien, 2016. (Year: 2016).*
Frisken, Sarah F., and Ronald N. Perry. "Simple and efficient traversal methods for quadtrees and octrees." Journal of Graphics Tools 7.3 (2002): 1-11. (Year: 2002).*
International Search Report and Written Opinion for Application No. PCT/EP2016/078050 dated May 9, 2017, 9 pages.
Faloutsas, C. et al., *DOT: A Spatial Access Method Using Fractals*, Int. Conference on Data Engineering (ICDE) (Apr. 1991) 152-159.
Kriegel et al., *Interval Sequences: An Object-Relationship Approach to Manage Spatial Data*, SSTD 2001, LNCS 2121 (2001) 481-501.
Kriegel, H-P. et al., *Spatial Query Processing for High Resolutions*, Proc. 8$^{th}$ Int. Conf. on Database Systems for Advanced Applications (DASFAA '03), Kyoto, Japan (2003) 10 pages.
Kriegel, H-P. et al., Presentation of *Spatial Query Processing for High Resolutions*, Proc. 8$^{th}$ Int. Conf. on Database Systems for Advanced Applications (DASFAA '03), Kyoto, Japan (2003) 30 pages.
Pfifle, M., *High Resolution Indexing for CAD Databases*, Diploma Thesis, University of Hagen (2001) 121 pages.
Pfifle, M., Presentation of High Resolution Indexing for CAD Databases, (*Objekt-relationale Verwaltung hochauflösender CAD-Datenbanken*) (Jul. 26, 2001) 31 pages.
Pfifle, M., *Spatial Database Support for Virtual Engineering*, Dissertation (2004) 366 pages.
Pfifle, M., Presentation of Spatial Database Support for Virtual Engineering (*Datenbankunterstützung für CAD-Anwendungen*), (Oct. 2004) 52 pages.
Uznir, U. et al., *Improving 3D Spatial Queries Search: Newfangles Technique of Space Filling Curves in 3D City Modeling*, ISPRS Annals of Photogrammetry, Remote Sensing and Spatial Information Sciences, vol. 11-2/W1 (2013) 319-327.
Occupancy Grid Mapping—Wikipedia, the free encyclopedia [online] [retrieved Jun. 21, 2019]. Retrieved from the Internet: <https://web.archive.org/web/20160929022705/https://en.wikipdia.org/wiki/Occupancy_grid_mapping>. (dated Sep. 29, 2016). 2 pages.
Z-Order Curve—Wikipedia, the free encyclopedia [online] [retrieved Jun. 21, 2019], Retrieved from the Internet: <https://web.archive.org/web/20161011175823/https://en.wikipedia.org/wiki/Z-order_curve>, (dated Oct. 11, 2016) 5 pages.
NDS Association [online] [retrieved Jun. 21, 2019]. Retrieved from the Internet: <https://web.archive.org/web/20161112111405/https://nds-association.org>, (dated Nov. 12, 2016) 1 page.
Office Action for European Application No. 16805325.4 dated Mar. 24, 2021, 6 pages.

* cited by examiner

NAVIGATION DATA SOURCE INDICATING SPATIAL OCCUPANCY

CROSS-REFERENCE TO RELATED APPLICATIONS

The present application is a national phase entry of International Application No. PCT/EP2016/078050, filed Nov. 17, 2016, all of which is incorporated herein by reference in its entirety.

FIELD OF THE INVENTION

The invention inter alia relates to the field of highly automated driving and describes inter alia data structures and methods, which can in particular be used for highly automated driving.

BACKGROUND OF THE INVENTION

Highly automated driving ("HAD") is based on highly accurate road geometries and objects on or next to the road. This information may be stored in a high definition map which is combined with in-vehicle sensor information at runtime. By combining the sensor data and the highly accurate map data, automated driving is made possible.

In order to map roads at an accuracy of 10 to 20 centimeters, LiDAR technology may be used to collect billions of 3D points and model road surfaces down to the number of lanes and their width.

It captures important details such as the slope and curvature of the road, lane markings and roadside objects such as sign posts, including what that signage denotes.

Maps designed for highly automated driving can deliver a highly accurate and realistic 3D border-to-border model of the road. Additionally, images along a road can provide information about roadside objects, wherein the color code can reflect the distance to the road (that is to its center line). Such a two dimensional image with a color code reflecting the distance can also be regarded as a set of three dimensional voxels.

This data may be used for a pattern-based localization solution. By matching the information about roadside objects with vehicle sensor data (which can also be regarded as a voxel set) and the HAD maps in real time, a vehicle can determine its precise position, even while traveling at high speeds or when changes to the roadside occur.

The Navigation Data Standard (NDS) already provides solutions for modeling detailed lane geometry and lane attributes efficiently. Still, the problem remains how to model the geometry of road furniture, e.g. guard railings, street lamps, etc. efficiently in a map. A size-effective, yet precise modeling of these objects is crucial for efficient positioning of vehicles.

It is therefore desired to organize environmental data efficiently so that a vehicle is enabled to efficiently create an environmental model based on the information stored in the database. The software in a vehicle shall be able to match real-world information obtained from its sensors to the information stored in the database. The vehicle shall be positioned precisely and the distance to solid obstacles shall be computed efficiently, as these are key aspects in highly automated driving. It is further desired that necessary data should stay reasonably small and updates should be supported.

SUMMARY OF SOME EMBODIMENTS OF THE INVENTION

It may thus be an object of the invention to provide an efficient data structure, which allows an application in a vehicle to carry out spatial queries, e.g. to retrieve all objects/voxels in a certain spatial area efficiently from a data source. Aspects of the invention may thus allow for efficient support for three dimensional spatial queries. Additionally, aspects of the invention may allow for a compact storage, minimal main memory consumption on an embedded device and/or a seamless integration of the presented approach into existing navigation data standards.

According to a first aspect of the invention, a navigation data source is described, the navigation data source comprising: an object data set, the object data set comprising object data, wherein the object data indicating a spatial vacancy and/or occupancy of sub-regions of a spatial region by one or more structural objects in the spatial region, and wherein the object data references the sub-regions based on a linear order of the sub-regions in the spatial region.

The navigation data source may be or may comprise any data source which is suitable for storing and/or transmitting navigation data. The navigation data source can thus be used for navigation and/or positioning purposes. The navigation data source may in particular allow for or support navigation and/or positioning at least in part based on surrounding objects (e.g. objects surrounding a vehicle). Examples of such a navigation data source are one or more files and/or one or more databases, in particular one or more files and/or one or more databases according to or at least partially compatible with the Navigation Data Standard (NDS) which is standardized by the NDS association. The website of the NDS association is presently available under the following link: http://www.nds-association.org.

For example, the navigation data source is a navigation database, e.g. a navigation database of a navigation device, e.g. a NDS database of a navigation device. The navigation devise may be a vehicle or a part thereof. The navigation database may comprise different sub-databases (e.g. NDS product databases) for storing navigation data sets for maps of different geographical regions and/or maps of different types, e.g. maps of different levels of detail. A navigation database may for example be a SQL (Structured Query Language) database (e.g. a SQLlite database). Alternatively or additionally, the navigation data source may be a navigation data file, for example a navigation data file for updating a navigation database of a navigation device (e.g. a NDS database of a navigation device). Example file formats for a navigation data file are the Physical Storage Format (PSF) as standardized by the NDS association, SQLlite data file format and/or Geographic Data Files (GDF) as standardized by the International Organization for Standardization (ISO, e.g. ISO GDF 4.0, formally referred to as ISO14825:2004, or ISO GDF 5.0, formally referred to as ISO14825:2011).

A data set is in particular understood to be a collection of data, for example a (relational) database table. The data set may comprise a single or multiple database tables. The data set may also comprise additional data. A data set may be stored in one or more files and may be stored in one or more locations. The data set may comprise one or more members or entries, for instance rows of a table.

The object data set comprises object data. The object data may for example be stored in one or multiple members or entries of the object data set.

The object data indicates spatial vacancy and/or occupancy of sub-regions of a spatial region by one or more structural objects in the spatial region. A vacancy of a sub-region of the spatial region is in particular understood to mean that no structural object is present at the respective sub-region. An occupancy of a sub-region of the spatial region is in particular understood to mean that at least one object occupies the respective sub-region. The object data may thus be understood to represent an "occupancy map" of (at least a part of) the spatial region. A sub-region of the spatial region may for example be defined to represent a spatial part of the spatial region. A sub-region of the spatial region may also represent a point-like part of the spatial region. The sub-regions of the spatial region may in particular be disjoint. The sub-regions may for example cover a part or the whole spatial region. The sub-regions are preferably defined to be regularly or irregularly distributed over the spatial region. The sub-regions may for instance be arranged as a (regular) grid structure. The sub-regions may in particular be represented by voxels.

The spatial region may for example be the geographic region corresponding to a navigation data set (as will further be explained below). The navigation data set may correspond to a tile data set, multiple tile data sets or a part of a tile data set. Each tile data set may represent a map of the intersection of a predetermined tile, e.g. as defined by the NDS, with the specific geographic region.

The object data references the sub-regions based on a linear order of the sub-regions in the spatial region. A linear order of the sub-regions in the spatial region is in particular understood to mean that each sub-region (except for the first and the last sub-region) has a predecessor and a successor.

Thus, it can unambiguously be determined which sub-region of the spatial region precedes and succeeds which sub-region. A linear order of the sub-regions can in particular be understood as a sequential arrangement of the sub-regions. The object data can be understood to store occupancy information of the sub-regions of the spatial region in a one dimensional linear data space.

As an example, the object data may indicate the spatial vacancy and/or occupancy in a binary form. Thus, only one of two states ("occupied" or "vacant") may be allowed for a sub-region. However, it may also be possible that the object data indicates a probability for a occupancy or a vacancy.

The navigation data source may comprise one more multiple object data sets. In case of multiple data sets each of at least a part of the multiple data sets may comprise object data as described herein and provided according to embodiments described herein. An object data set may be stored directly in the navigation data set or they may be part of or stored in another data structure within the navigation data source (e.g. a navigation data set).

The information whether a sub-region of a spatial region is occupied by one or more objects may be made available through collected (and post-processed) sensor data (e.g. LiDAR data), for example. A navigation data source and in particular the object data according to the first aspect may, for example, be created based on the collected (and post-processed) sensor data.

According to an exemplary embodiment of the navigation data source according to the first aspect, the linear order is based on a space filling curve through the spatial region linearly ordering the sub-regions of the spatial region. A space filling curve is in particular understood to be a line which runs through this (e.g. two or three dimensional) region (i.e. through every sub-region of the region), or through a regular grid describing this region respectively. For instance, in case of a space filling curve for a three dimensional spatial region, the space filling curve may be based on a space filling curve filling a two dimensional space, which path is extended into a third dimension. A space filling curve efficiently allows bringing the sub-regions of the spatial region in a one-dimensional order.

According to an exemplary embodiment of the navigation data source according to the first aspect, the space filling curve is a Z-order curve. A Z-order curve (in three dimensions) has shown to be particularly advantageous for referencing sub-regions of a spatial region for navigation and positioning purposes. Other examples of a space filing curve, which may be used for establishing a linear order of the sub-regions are a Hilbert curve, a Moore curve, a Dragon curve, a Gosper curve, a Koch curve, a Sierpinski curve, or an Osgood curve.

According to an exemplary embodiment of the navigation data source according to the first aspect, the spatial region is a three dimensional region, and the linear order allows for a one dimensional ordering of the sub-regions of the spatial region. The spatial region may for example be a three dimensional geographic region. For instance, the spatial region may cover a part of the spatial region on the earth's surface.

According to an exemplary embodiment of the navigation data source according to the first aspect, the object data uses voxels associated with the sub-regions of the spatial region, wherein a value of a respective voxel indicates a spatial vacancy and/or occupancy of a respective sub-region by the one or more structural objects in the spatial region.

A voxel may in particular be understood to represent a value on a (regular) grid in three-dimensional space. As with pixels in a bitmap, voxels themselves do not typically have their position (their coordinates) explicitly encoded along with their values. Instead, the position of a voxel is inferred based upon its position relative to other voxels (i.e., its position in the data structure). In contrast, points and polygons are often explicitly represented by the coordinates of their vertices. The use of voxels allows for efficiently representing a regularly sampled space (e.g. the spatial region) that are non-homogeneously filled (e.g. by the structural object). This may be particularly the case for structural objects on and around roads.

Preferably, the value of a voxel is binary, e.g. "1" or "0". A binary value is sufficient for indicating occupancy (e.g. "1") or vacancy (e.g. "0") for a sub-region of the spatial region. Alternatively, the value of a voxel may also take other values, e.g. an integer value or values between 0 and 1. This would allow for indicating an occupation probability, for example.

According to an exemplary embodiment of the navigation data source according to the first aspect, the object data indicating a spatial vacancy and/or occupancy of sub-regions of the spatial region by one or more structural objects describes the spatial region with a first resolution in a first dimension, a second resolution in a second dimension and a third resolution in a third dimension, wherein preferably the third resolution in the third dimension is smaller than the first resolution in the first dimension and/or the second resolution in the second dimension. Alternatively, the first resolution in the first dimension, the second resolution in the second dimension, and the third resolution in the third dimension may be qual. The described spatial region may have a size of several meters in each dimension, for example.

For instance, the first and/or the second dimension correspond to dimensions (locally) parallel to the surface of the earth, i.e. length and/or width of the spatial region, which may also be referred to as "x" and "y". For instance, the third dimension corresponds to the dimension (locally) perpendicular to the surface of the earth, i.e. height of the spatial region, which may also be referred to as "z".

For instance, in case there are 16 bits reserved for addressing sub-regions in each dimension in a classical data structure, each sub-region (e.g. a small volume or point) in the spatial region could be addressed by a three dimensional vector (x, y, z), in which each dimension consists of 16 bits. By now referencing said sub-regions based on a linear order, e.g. based on a space filling curve, each of these sub-regions is mapped on an integer value of 48 bits. The sub-regions can now be referenced by the object data based on their resulting linear order, in particular without having to store respective coordinates.

Rather than using the same resolution for all the dimensions, the third resolution can now be smaller than the first and/or second resolution, e.g half as small or even smaller. For instance, if there are 16 bits for the x- and y-dimension, there may only be 8 bits for the z-dimension. The linear order may in this case be established by an interleaving of bits in the mapping processes, for instance x1, y1, x2, y2, z1, x3, y3, x4, y4, z2, etc.

According to an exemplary embodiment of the navigation data source according to the first aspect, the object data comprises an occupancy sequence indicating a spatial vacancy and/or occupancy of sub-regions of the spatial region. The occupancy sequence may be a collection of data, in particular stored as a single entity, such as a binary large object ("BLOB"). For instance, the occupancy sequence may be a binary sequence. For instance, the occupancy is a bit stream. An exemplary occupancy sequence may be (110111), wherein the "1" indicates an occupancy for the first, second, fourth, fifth and sixth sub-region according to the linear order and wherein the "0" indicates a vacancy for the third sub-region according to the linear order. The sub-regions are referenced based on their linear order. The occupancy sequence may indicate a spatial vacancy and/or occupancy of each of or, preferably, only a part of the sub-regions of the spatial region.

According to an exemplary embodiment of the navigation data source according to the first aspect, the object data comprises interval information about an occupied interval, in particular a lower interval border and/or an upper interval border, the occupied interval indicating a group of one or more, according to the linear order, successional sub-regions, which are spatially occupied.

The object data may comprise interval information about one or more occupied intervals. In case of multiple intervals, the interval information may comprise respective interval borders for each interval. The adding of interval information about an occupied interval may be understood as a grouping of successional and spatially occupied sub-regions into intervals. As an example, above occupancy sequence of (110111) may be transformed into occupied intervals (1, 2) and (4, 6). Again, the sub-regions are referenced based on their linear order. The interval (1, 2) and (4, 6) comprise the lower interval borders "1" and "4" and the upper interval borders "2" and "6", respectively. A (completely) occupied interval can also be termed a "black interval", as the occupied interval is designed such that it does not indicate a vacancy of a sub-region. The object data may only comprise interval information about occupied intervals. However, the object data may also comprise interval information about other intervals than occupied intervals, e.g. partially occupied intervals, as further described below. The use of interval information and the concept of occupied intervals may save space in the navigation data source and also in the main memory.

According to an exemplary embodiment of the navigation data source according to the first aspect, the object data comprises interval information about an at least partially occupied interval, in particular a lower interval border and/or an upper interval border, the at least partially occupied interval indicates a group of, according to the linear order, one or more successional sub-regions, at least a part of which are spatially occupied, wherein the object data comprises an occupancy sequence indicating a spatial vacancy and/or occupancy of the successional sub-regions of the at least partially occupied interval.

The object data may comprise interval information about one or more at least partially occupied intervals. In case of multiple intervals, the interval information may comprise respective interval borders and a respective occupancy sequence for each interval. A partially occupied interval may be understood as an occupied interval including "small gaps". As an example, above occupancy sequence of (110111), which was transformed into occupied intervals (1, 2) and (4, 6), can in case of utilizing a partially occupied interval be transformed into the (single) interval (1, 6). Again, the sub-regions are referenced based on their linear order. The interval (1, 6) comprises the lower interval border "1" and the upper interval border "6". A partially occupied interval can also be termed a "grey interval", as the partially occupied interval is designed such that it also indicates a vacancy of a sub-region. In case of a (completely) occupied interval, one would have the case of a "black interval" as described before. The concept of partially occupied intervals may save even more disk space and memory space.

However, in case the object data would only comprise the interval information (lower interval border, upper interval border), one would lose information about the vacant sub-region.

Thus, it is preferred that the object data also comprises an occupancy sequence indicating a spatial vacancy and/or occupancy of the successional sub-regions of the (at least) partially occupied interval. The object data can for example comprise data in the form of <(lower interval border, upper interval border), (occupancy sequence)>. In above example, this would be <(1, 6), (110111)>.

As will be explained in more detail below, an object data set preferably comprises multiple entries, each comprising object data. In that case, the object data of an entry preferably comprises interval information (and an occupancy sequence) pertaining to only a single interval.

According to an exemplary embodiment of the navigation data source according to the first aspect, the successional sub-regions of the at least partially occupied interval comprise not more than a maximum number of consecutive spatially vacant sub-regions. For example, the maximum number of consecutive spatially vacant sub-regions may be a predetermined number. As another example, the maximum number of consecutive spatially vacant sub-regions may be a dynamically adapted number. For instance, the maximum number maximum number of allowed consecutive spatially vacant sub-regions may be as small as 1, but a number of 1,000,000 may also possible. As an example, the maximum number maximum number of allowed consecutive spatially vacant sub-regions may depend on the (first, second and/or third) resolution, with which the object data is describing the spatial region.

According to an exemplary embodiment of the navigation data source according to the first aspect, the object data set comprises multiple entries, wherein each of the entries comprises: one or more identifiers, in particular an object identifier and/or a navigation data set identifier; and object data, in particular comprising interval information and/or an occupancy sequence.

As an example, an entry of the object data set may be a member of the object data set. In case the object data set is a (relational) table, an entry may be a row of the table. As described above, in case the object data uses (at least) partially occupied intervals, the object data preferably also comprises an occupancy sequence. The occupancy sequence preferably indicates a spatial vacancy and/or occupancy of sub-regions of the spatial region. As also described above, the occupancy sequence may for example be a binary sequence, such as a bit stream.

An object identifier may in particular identify a structural object or a class (e.g. the type of object, such as "pole", "bench", "fence") of a structural object. For instance, the object identifier may indicate the structural object or the class thereof occupying one or more sub-regions, the occupancy of which is indicated by the object data (e.g. of the entry in the object data set). This allows easily identifying the structural object, to which the object data pertains. However, if it is not relevant, by which object the sub-regions are occupied, the object identifier may be omitted.

A navigation data set identifier may uniquely identify a navigation data set. In case the navigation data set corresponds to a tile data set, the navigation data set identifier may be a globally unique tile identifier, e.g. as defined by the NDS. This allows, for example, indexing of the navigation data set identifier in order to check for relevant navigation data sets.

In case the object data uses (at least partially) occupied intervals and according to an exemplary embodiment of the navigation data source according to the first aspect, each of the entries pertains to one occupied or at least partially occupied interval. This allows an efficient indexing and thus provides an efficient data structure allowing for efficient spatial queries.

According to an exemplary embodiment of the navigation data source according to the first aspect, wherein said one or more structural objects comprise roads, road objects, and/or roadside objects. Examples of roads are parkways, avenues, freeways, interstates, highways, or primary, secondary, and tertiary local roads. Road objects and roadside objects are in particular understood as a collective term for objects and pieces of equipment installed on and aside streets and roads for various purposes. Examples of such objects are benches, traffic barriers, bollards, post boxes, phone boxes, streetlamps, traffic lights, traffic signs, bus stops, tram stops, taxi stands, public lavatories, fountains, watering troughs, memorials, public sculptures, and waste receptacles.

According to an exemplary embodiment of the navigation data source according to the first aspect, the navigation data source further comprises a navigation data set representing a map of a geographic region, wherein the navigation data set and the object data set pertain at least in part to the same region.

The map represented by the navigation data set may for example define or comprise routing nodes and routing links between corresponding routing nodes. The routing nodes and routing links may represent (at least a part of) a routing or transportation (e.g. a road, trail and/or rail) network of the corresponding geographic region.

As explained above, the navigation data set may correspond to a tile data set, multiple tile data sets or a part of a tile data set. The navigation data set may in particular be a tile data set. For example, a geographical area such as the surface of the earth may be sub-divided into predetermined tiles.

The tiles are for example tiles of a regular or irregular grid and/or a geographic grid. Each tile may be associated with a tile identifier (e.g. a unique tile identifier). The tiles may be seen as logical tiles (regularly) partitioning a map of a geographic region. The navigation data set or tile data sets may be completely or only partially filled with navigation data.

The map represented by a navigation data set may be an independent map, for example a map independent of maps represented by other navigation data sets of the navigation data source such that a navigation data set of the navigation data source may be updatable independently from other or further navigation data sets of the navigation data source.

A navigation data set may further comprise gateway data defining one or more gateways. For example, the gateway data may comprise a gateway table (e.g. a regional gateway table), wherein each entry of the gateway table at least partially defines one gateway. Gateways can be seen as describing connections or transitions between different navigation data sets. A gateway may be defined by position information specifying the position associated with the gateway.

That the navigation data source comprises a navigation data set, it is understood that the navigation data set may comprise one or more navigation data sets. As described above, the navigation data source may also comprise one or more object data sets.

In one example, the navigation data source comprises multiple navigation data sets and one (global) object data set. The (global) object data set may in this case pertain to a spatial region which (at least partially) covers, overlaps or is located within the geographical region, which the maps of the different navigation data sets pertain to.

In another example, the navigation data source comprises multiple navigation data sets and multiple (local) object data sets. For example, at least one (local) object data set may be associated with (e.g. stored together with or inside) the navigation data set (which may be a tile data set). For instance, one (local) object data set is provided for each navigation data set.

The navigation data set and the object data set may pertain at least in part to the same region may, because the spatial region, which the object data set is pertaining to, at least partially covers, at least partially overlaps with or is at least partially located within said geographic region, which the navigation data set pertains to.

According to an exemplary embodiment of the navigation data source according to the first aspect, the navigation data source comprises index data indexing at least a part of the object data, in particular interval information, and/or an identifier, in particular a navigation data set identifier.

The index data may be a database index. The index data may be a data structure that improves the speed of data retrieval operations on the object data set. The index data may allow for quickly locating object data without having to search every entry of the object data set (e.g. every row in a database table). For instance, the index data can be created using one or more parameters (e.g. one or more columns of a database table, such as the interval information or certain identifiers) stored in the object data set. For instance, as explained above, the object data set may comprise multiple entries. The index data may index at least a part, preferably each of said entries of the object data set. As an example, the index data may be comprised by the object data set. Alternatively, the index data may also be stored separate from the object data set.

According to an exemplary embodiment of the navigation data source according to the first aspect, the index data is based on a tree structure, in particular a B-tree or a RI-tree.

A B-tree is in particular understood to be a self-balancing tree data structure. The B-tree may keep data sorted and may allow searches, sequential access, insertions, and deletions in logarithmic time. The B-tree can be considered as a generalization of a binary search tree, as a node can have more than two children. The B-tree may allow for an optimized performance in case of large blocks of data, such as the object data of large spatial regions. A B-tree may in particular be used for indexing an identifier, in particular a navigation data set identifier (e.g. a tile data set identifier).

An RI-tree, or relational interval tree, is in particular a tree data structure to hold intervals. The RI-tree may also hold further data. An RI-Tree may in particular allow efficiently determining all intervals that overlap with any given interval (e.g. a query interval). An RI-tree may in particular be used for indexing at least a part of the object data, in particular interval information.

According to the first aspect of the invention, a computer readable storage medium is also described, in which a navigation data source according to the first aspect is stored.

According to a second aspect of the invention, a method is described, performed by at least one apparatus, said method comprising: obtaining query information representative of a spatial query object in a spatial region; determining, based on the query information, query data indicating one or more queried sub-regions of the spatial region, wherein the query data references the queried sub-regions based on a linear order of the queried sub-regions in the spatial region; and checking, based on the query data and object data of a navigation data source according to the first aspect, whether the queried sub-regions are spatially occupied or potentially spatially occupied.

It may be necessary to check, e.g. for a navigation device, whether certain sub-regions of a spatial region are (potentially) occupied. Thus, corresponding query information may be obtained. The spatial query information may be of any form suitable for defining a spatial query object. As an example, in a simple case, a spatial query object may be a three dimensional box or a rectangular spatial region. The query information may be provided as coordinates sufficiently defining the corresponding spatial query object. However, different and more complex spatial query objects are also be possible. The query information may be obtained from an inquirer, e.g. another part of the apparatus performing the method, or another apparatus (e.g. in a wire-bound or wireless manner).

The spatial region of the second aspect may (at least in part) overlap with the spatial region according to the first aspect.

However, the object data set of the navigation data source according to the first aspect references the sub-regions of the spatial region based on a linear order. The query information may thus be used for determining query data indicating one or more queried sub-regions of the spatial region. The step of determining query data based on the query information may be seen as transforming the query information into corresponding query data. The determined query data now also references the queried sub-regions based on a linear order of the queried sub-regions in the spatial region. The linear order corresponds to or is compatible with the linear order used in the navigation data set according to the first aspect.

Thus, the determined query data and the object data of the navigation data source according to the first aspect are compatible. Based on the query data and the object data of the navigation data source according to the first aspect, it can then be checked whether the queried sub-regions are spatially occupied or potentially spatially occupied. The checking, whether the queried sub-regions are spatially occupied or potentially spatially occupied, may in particular allow for a determination of the queried sub-regions, which are (potentially) spatially occupied.

The query data may have a similar structure compared to the object data described with respect to the first aspect. With regard to preferred embodiments of the query data it is thus referred to the description of the object data with respect to the first aspect.

The method according to the second aspect may in particular be regarded as a query process, in particular a multi-step (e.g. an (at least) two-step or three-step) query process. For instance, it may first be determined, which queried sub-regions are potentially spatially occupied. It may then be determined, which of the potentially spatially occupied sub-regions are spatially occupied.

The method may for instance be performed by an apparatus according to the second aspect. For instance, the method may be performed by a data processing device. The apparatus may be a navigation device. The apparatus may also be a motor vehicle or a part thereof (such as a data processing device, e.g. a navigation device, of the motor vehicle). A motor vehicle may be understood as a self-propelled road vehicle (e.g. a car, truck, or bus).

That a queried sub-region is potentially spatially occupied is in particular understood to mean that it cannot be excluded for certain (e.g. in contrast to other sub-regions) that the respective queried sub-region is spatially occupied.

According to an exemplary embodiment of the method according to the second aspect, the method further comprises: providing a query result based on said checking, whether said queried sub-regions are spatially occupied or potentially spatially occupied. The provision of a query result may be realized by the provision of one query result or by the provision of multiple (e.g. a first query result and a second query result). The first query result may for instance be available after a short time (e.g. after a first step of the query process), but may only provide a preliminary result. For instance, the first query result may only indicate a potential spatial occupancy of at least a part of the queried sub-regions. The second query result may be available after a longer time than the first query result (e.g. after a second step of the query process), but may have a higher precision than the first query result (e.g. may be a final result). For instance, the second query result may indicate a definitive spatial occupancy or vacancy of the queried sub-regions.

According to an exemplary embodiment of the method according to the second aspect, the query result indicates whether said queried sub-regions are spatially occupied. For instance, the query result may provide information (e.g. in the structure of the query data or the query information), wherein the information or data now indicates the (potential) occupancy of the respective queried sub-regions.

According to an exemplary embodiment of the method according to the second aspect, the query result indicates one or more structural objects at least partially overlapping with the spatial query object. It may be the case, that detailed information about the spatial occupancy or vacancy of queried sub-regions is not needed. In this case the query result may indicate one or more structural objects at least partially overlapping with (e.g. at least partially located in) the spatial query object.

For instance, the query result may comprise object identifiers of the corresponding structural objects. For example, the query result may indicate that objects "A", "B" and "C" or objects of class "A", "B" and "C" are at least partially located in the spatial query object (e.g. a query box).

According to an exemplary embodiment of the method according to the second aspect, the method further comprises: determining or aiding in determining of a position of a vehicle based on the query result. As an example, a first (coarse) positioning of the vehicle may be performed on the basis of positioning information derived from a global navigation satellite system (GNSS) such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). A second (more accurate) position of the vehicle, as it is needed for instance for highly automated driving (HAD), may then be determined on the basis of the query result.

As an example, environmental information may be obtained (e.g. in the form of sensor data via a sensor of the vehicle). The environmental information may comprise information about the environment surrounding the vehicle. The environmental information may indicate a spatial vacancy and/or occupancy of sub-regions by one or more structural objects in the environment of the vehicle. The method according to the second aspect allows querying a navigation data source according to the first aspect. The spatial query object may (at least in part) correspond to the environment of the vehicle. Based on the query result and the environmental information, e.g. by comparing the query result with the environmental information, the determination of a position of the vehicle may be performed or aided. In one example, the query result can be used to create an environmental model of the environment of the vehicle. The environmental model can then be compared with the environmental information in order to determine or aid in determining a position of the vehicle.

According to an exemplary embodiment of the method according to the second aspect, the query data comprises a query sequence indicating queried sub-regions of the spatial region. The query sequence may have the same structure as the occupancy sequence of object data. Thus, the query sequence may be a collection of data, in particular stored as a single entity, such as a binary large object ("BLOB"). For instance, the query sequence may be a binary sequence. For instance, the query sequence is a bit stream. An exemplary query sequence may be (110110), wherein the "1" indicates a queried sub-region according to the linear order and wherein the "0" indicates that these sub-regions according to the linear order are not queried. The sub-regions are referenced based on their linear order. The query data may also comprise one or more query sequences.

According to an exemplary embodiment of the method according to the second aspect, the determined query data comprises query interval information about a queried interval, in particular a lower query interval border and/or an upper query interval border, the query interval indicating a group of one or more, according to the linear order, successional sub-regions, which are queried.

The query interval information about a queried interval may be of the same structure as the interval information about an occupied interval. The query data may comprise query interval information about one or more queried intervals. In case of multiple queried intervals, the query interval information may comprise respective query interval borders for each query interval. The adding of query interval information about a queried interval may be understood as a grouping of successional queried sub-regions into queried intervals. As an example, above query sequence of (110110) may be transformed into queried intervals (1, 2) and (4, 5). The sub-regions are referenced based on their linear order. The queried intervals (1, 2) and (4, 5) comprise the lower query interval borders "1" and "4" and the upper query interval borders "2" and "5", respectively. A (completely) queried interval can also be termed a "black query interval", as the queried interval is designed such that it does not indicate a non-queried sub-region. The query data may only comprise query interval information about queried intervals. However, the query data may also comprise query interval information about other intervals than queried intervals, e.g. partially queried intervals, as further described below. The use of query interval information and the concept of queried intervals may allow for a fast query processing of a navigation data source according to the first aspect, in particular using interval information indicating a spatial vacancy and/or occupancy of sub-regions of the spatial region.

According to an exemplary embodiment of the method according to the second aspect, wherein said determined query data comprises query interval information about an at least partially queried interval, in particular a lower query interval border and/or an upper query interval border, said at least partially queried interval indicates a group of, according to said linear order, one or more successional sub-regions, at least a part of which are queried, and wherein said query data comprises a query sequence indicating queried sub-regions of said at least partially queried interval.

The query interval information about an at least partially queried interval may be of the same structure as the interval information about an at least partially occupied interval. The query data may comprise query interval information about one or more at least partially queried intervals. In case of multiple query intervals, the query interval information may comprise respective query interval borders and a respective query sequence for each query interval. A partially queried interval may be understood as a queried interval including "small gaps". As an example, above query sequence of (110110), which was transformed into queried intervals (1, 2) and (4, 5), can in case of utilizing a partially queried interval be transformed into the (single) queried interval (1, 5). Again, the sub-regions are referenced based on their linear order. The interval (1, 5) comprises the lower interval border "1" and the upper interval border "5". A partially queried interval can also be termed a "grey query interval", as the partially queried interval is designed such that it also indicates non-queried sub-region. In case of a (completely) queried interval, one would have the case of a "black query interval" as described before. Again, it is preferred that the query data also comprises a query sequence indicating queried sub-regions of the (at least partially) queried interval. The query data can for example comprise data in the form of <(lower query interval border, upper query interval border), (query sequence)>. In above example, this would be <(1, 5), (11011)>.

According to an exemplary embodiment of the method according to the second aspect, the checking, whether the queried sub-regions are spatially occupied or potentially spatially occupied, is based on one or more of the following: index data indexing at least a part of the object data; general interval properties; and/or one or more query sequences of the query data and one or more occupancy sequences of object data.

In an example, the object data may comprise interval data and the query data may comprise query interval data. The index data of the object data may in this case in particular index the interval information of the object data, in particular based on a an RI-tree. Based on the index data indexing at least a part of the object data, it can be quickly determined whether one or more (partially) queried intervals overlap with (partially) occupied intervals. In particular, the relevant (partially) occupied intervals can be determined. Thus, the checking may comprise the (e.g. first) step of determining, based on the index data indexing at least a part of the object data, whether one or more (partially) queried intervals overlap with (partially) occupied intervals. As both, the occupied and queried intervals may be only partially queried or occupied respectively, on overlap of a partially queried interval with a partially occupied interval may not necessarily result in a spatially occupied queried sub-region, but only in a potentially spatially occupied queried sub-region.

Nevertheless, based on index data of the object data, overlapping (partially) queried intervals with (partially) occupied intervals may be determined and it may thus be determined that queried sub-regions are potentially spatially occupied. A corresponding (first, preliminary) query result may be provided.

In an example, the checking may comprise the (e.g. second) step of determining, based on the general interval properties, whether one or more (partially) queried intervals comprise queried sub-regions, which are spatially occupied. An example general interval property may be that intervals do not indicate vacant or non-queried sub-regions at their interval borders. Thus, a (partially) occupied interval overlapping with a (partially) queried interval at the border must result in a spatially occupied queried sub-region. Another example of a general interval property may be that a partially queried or occupied interval may not indicate more than a maximum number of spatially vacant or non-queried sub-regions. From this, it may also be deduced in certain cases, that a spatially occupied queried sub-region must exist. At this point, the actual occupancy sequence or the actual query sequence of an interval has still not been used.

In an example, the checking may comprise the (e.g. third or final) step of determining, based on one or more query sequences of the query data and one or more occupancy sequences of object data, which queried sub-regions are spatially occupied. This may allow for providing a (final) query result.

According to an exemplary embodiment of the method according to the second aspect, the method further comprises: determining at least one navigation data set or a part thereof associated with an object data set potentially relevant for the checking, whether the queried sub-regions are spatially occupied or potentially spatially occupied. As described, the navigation data source may comprise one or more navigation data sets and a navigation data set or a part thereof may be associated with a (local) object data set, e.g. the (local) object data set may be stored together with or inside the navigation data set. Thus, in order to efficiently access the relevant object data set, the corresponding navigation data set or part thereof should be determined. This may be done based on index data of the navigation data source indexing the navigation data set identifiers (e.g. based on a B-tree).

According to the second aspect of the invention, a computer program code is also described, the computer program code when executed by a processor causing an apparatus to perform the actions of the method according to the second aspect.

According to the second aspect of the invention, a computer readable storage medium is also described, in which computer program code according to the second aspect is stored.

The described computer readable storage medium according to the first or second aspect may be a non-transitory and/or tangible computer readable storage medium. The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to the second aspect of the invention, an apparatus configured to realize or comprising respective means for realizing the method according to the second aspect is also described. The means of these apparatuses can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

According to the second aspect of the invention an apparatus comprising at least one processor and at least one memory including computer program code is also described, the at least one memory and the computer program code configured to, with the at least one processor, cause an apparatus at least to perform the method according to the second aspect.

Any of the described apparatuses may comprise only the indicated components or one or more additional components. Any of the described apparatuses may be a module or a component for a device, for example a chip. Alternatively, any of the described apparatuses may be a device. Any of the described apparatuses may for instance at least comprise a user interface, a communication interface and/or an antenna.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
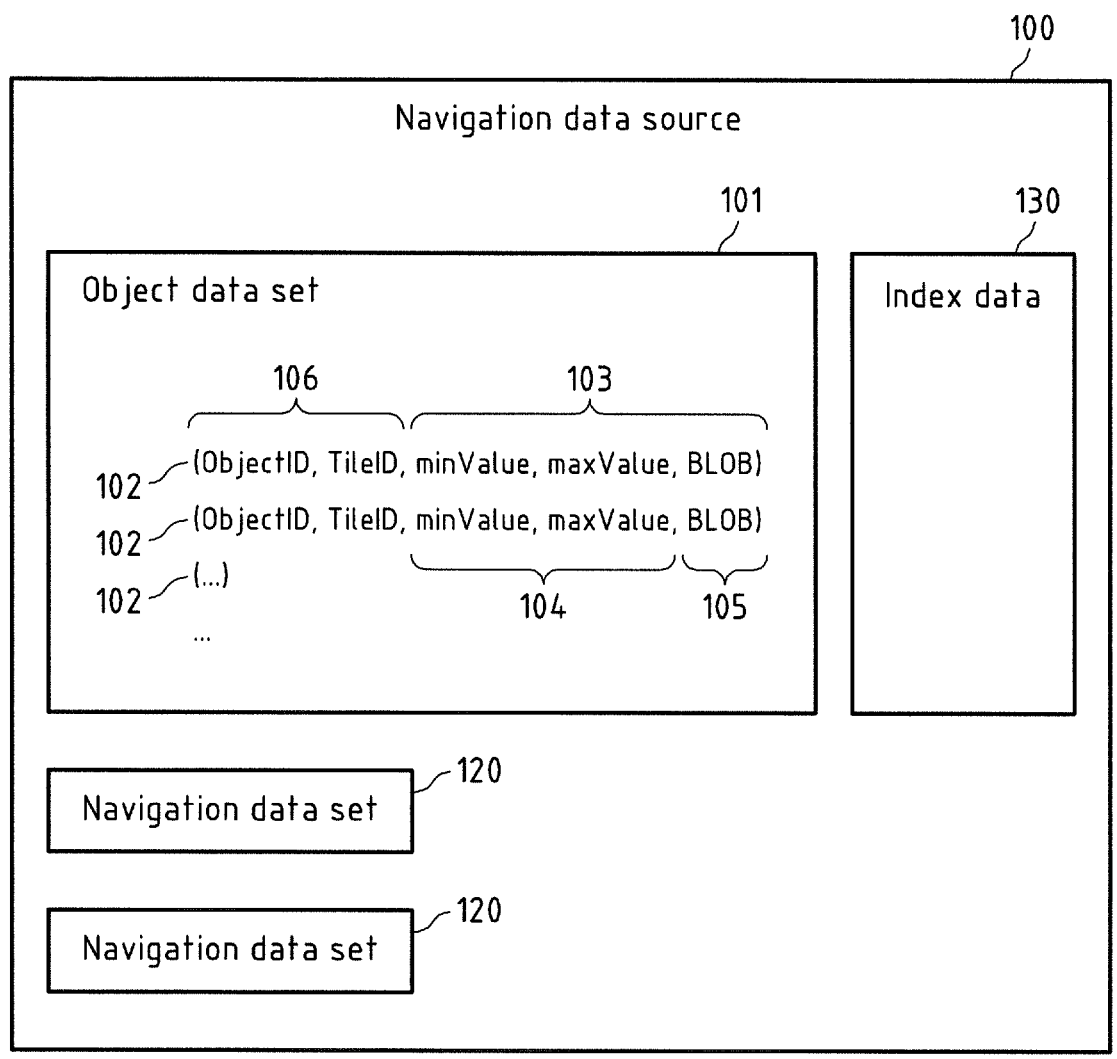
FIG. 1 is a schematic illustration of an exemplary embodiment of a navigation data source according to the first aspect of the invention and of an exemplary embodiment of query data.
Figure 1:
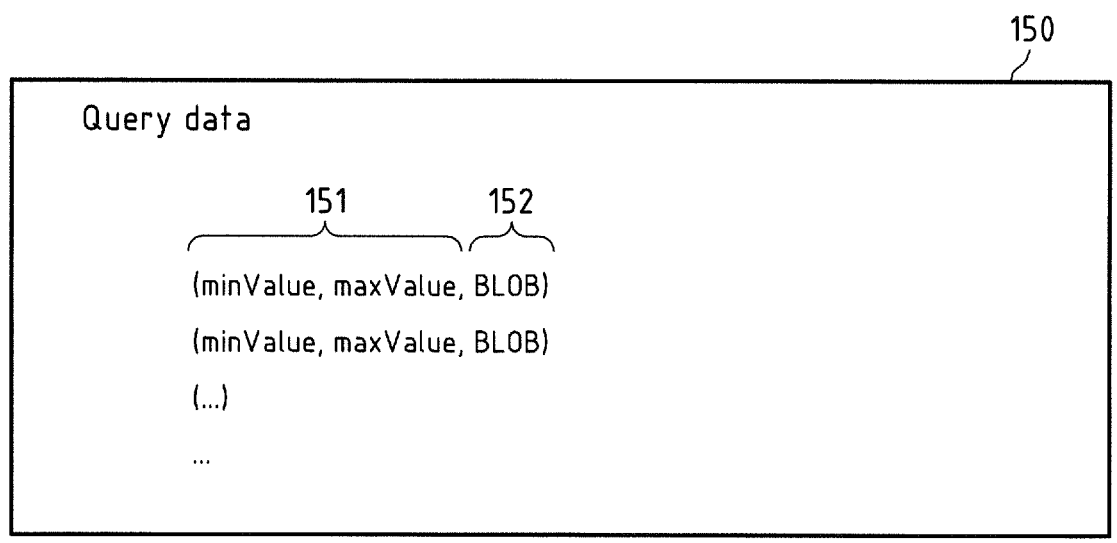

FIG. 1 is a schematic illustration of an exemplary embodiment of a navigation data source 100 according to the first aspect of the invention. The navigation data source comprises an object data set 101. The navigation data source 100 also comprises navigation data sets 120. The object data set 101 may be a database table, for example. The object data set 101 comprises multiple entries 102. Each entry comprises object data 103. The object data 103 indicates a spatial vacancy and/or occupancy of sub-regions of a spatial region by one or more structural objects in said spatial region. The structural objects comprise roads, road objects, and/or roadside objects. The object data 103 references the sub-regions based on a linear order of the sub-regions in the spatial region, as will be explained in the following with respect to FIGS. 4 and 5.

Figure 5A:
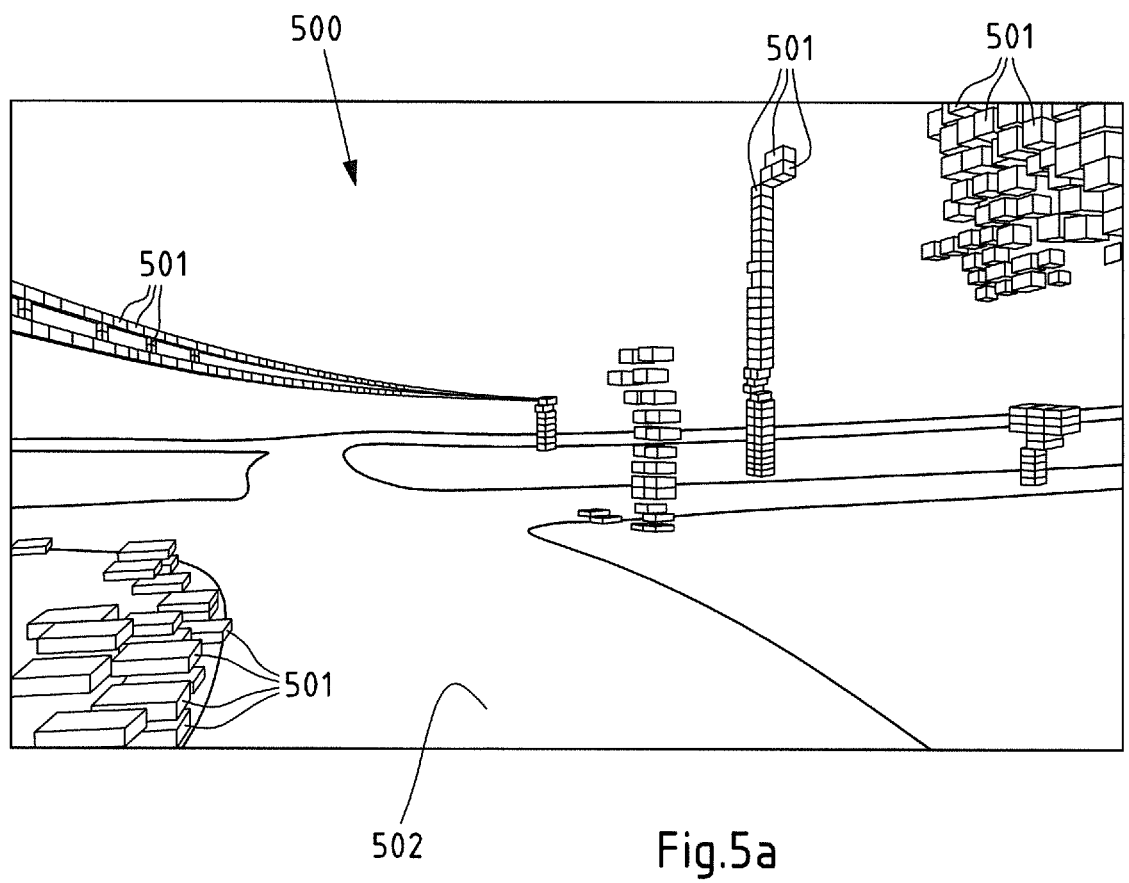
FIG. 5a is a graphical illustration of the occupancy of sub-regions of a spatial region.

FIG. 5a is a graphical illustration of the occupancy of sub-regions 501 of a spatial region 500. The object data utilized voxels associated with the sub-regions 501. Voxels with a value of "1", illustrated as solid blocks in FIG. 5a, indicate a spatial occupancy of the corresponding sub-region 501 because a structural object is present at the corresponding sub-region 501 in the spatial region 500. Voxels with a value of "0", not illustrated in FIG. 5a, indicate a spatial vacancy of the corresponding sub-region because no structural object is present at the corresponding sub-region in the spatial region 500.

The information about the structural objects in the spatial region 500 may have been collected via sensors beforehand, e.g. by a LiDAR-System.

Also depicted in FIG. 5a is a map 502 of a geographic region. The spatial region 500 and the geographic region pertain at least in part to the same region. The map 502 of the geographic region can be represented by the navigation data sets 120, for example.

Figure 4A:
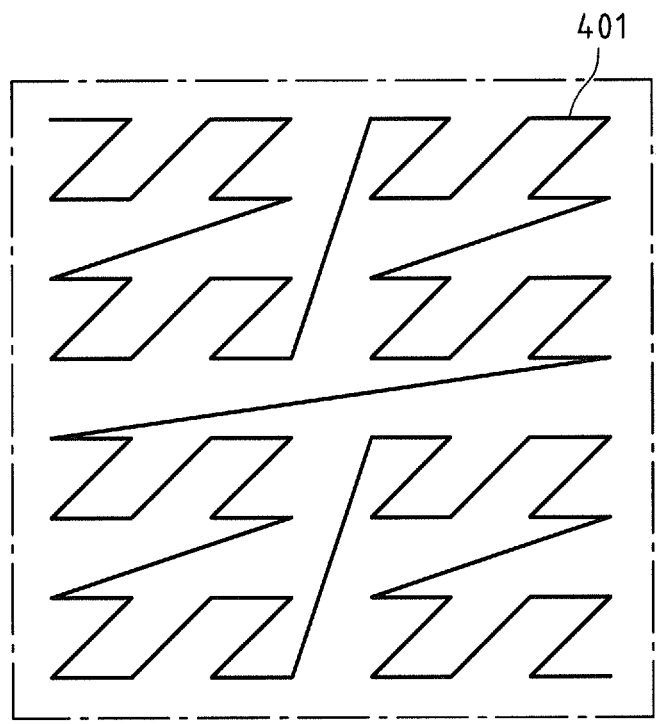
FIG. 4 shows graphical illustrations of examples of space filling curves.
Figure 4B:
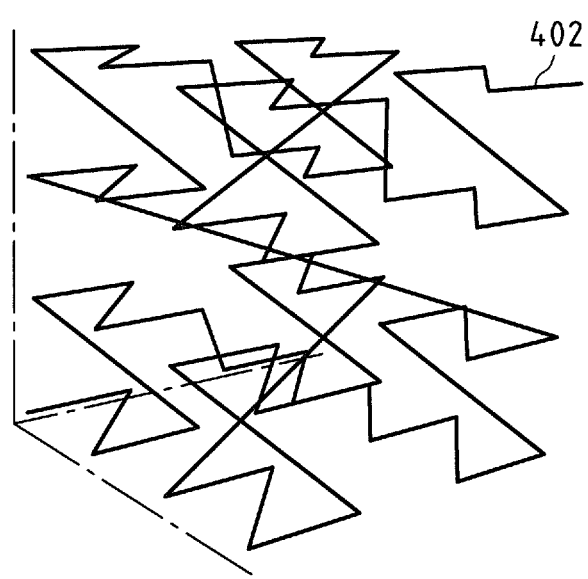

FIG. 4 now illustrates how a linear order of the sub-regions in the spatial region is created. The linear order is based on a space filling curve through the spatial region 500 linearly ordering the sub-regions 501 of the spatial region 500. For this, FIG. 4 shows graphical illustrations of examples of space filling curves 401, 402. Curve 401 is a two-dimensional space filling curve (Z-order curve). In order to create a linear order of the voxels illustrated in FIG. 5a, the two dimensional space filling curve 401 a third dimension (height) is added and the two dimensional space filling curve 401 is extended into a three dimensional space filling curve 402. In this way a linear order of the sub-regions 501 (and thus the voxels) can be established, so that a one dimensional data space can be used to store information about the occupancy (e.g. voxel values) of the sub-regions 501. Thus, the linear order allows for a one dimensional ordering of the sub-regions 501 of the spatial region 500.

Figure 5B:
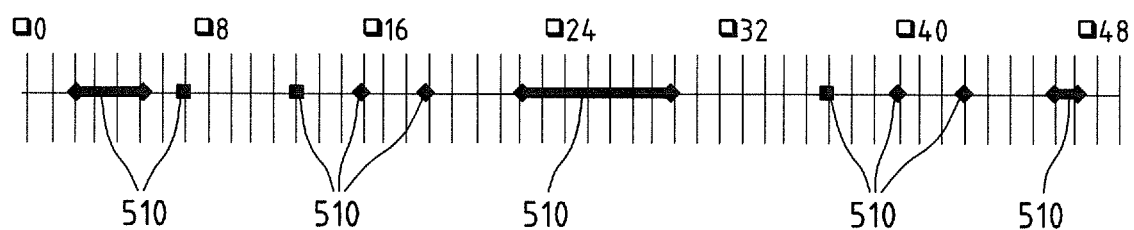
FIG. 5b is a graphical illustration of occupied intervals indicating a spatial occupancy of the sub-regions based on a linear order of the sub-regions in the spatial region.

As an example, assuming that the sub-regions at positions (according to the linear order) 2, 3, 4, 5, 7, 12, 15, 18, 22, 23, 24, 25, 26, 27, 28, 29, 36, 39, 42, 46, 47 are occupied by one or more structural objects. This is illustrated in FIG. 5b. FIG. 5b is a graphical illustration of occupied intervals 510 in a one-dimensional data space indicating a spatial occupancy of the sub-regions 501 based on a linear order of the sub-regions 501 in the spatial region 500.

In order to save space (e.g. in the navigation data source and also in the main memory), interval information about occupied intervals 510 can be stored in order indicate successional occupied sub-regions 501. For example, the object data 103 could comprise interval information (a lower interval border and an upper interval border 104) about the occupied intervals 510 ("black intervals"). Accordingly, each object data 103 of the different entries 102 may have the structure (minValue, maxValue), that is in above example, (2, 5), (7, 7), (12, 12), (15, 15), (18, 18), (22, 29), (36, 36), (39, 39), (42, 42), and (46, 47).

Figure 5C:
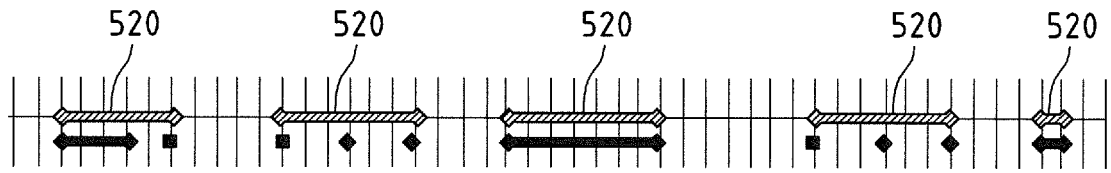
FIG. 5c is a graphical illustration of partially occupied intervals indicating a spatial occupancy of the sub-regions based on a linear order of the sub-regions in the spatial region.

In order to further save space, the object data can comprise interval information (a lower interval border and an upper interval border 104) about at least partially occupied intervals 520 ("grey intervals"). The at least partially occupied intervals indicate successional sub-regions 501, at least a part of which are spatially occupied. Accordingly, each object data 103 of the different entries 102 may have the structure (minValue, maxValue), that is in above example (2, 7), (12, 18), (22, 29), (36, 42), and (46, 47). In order not to lose any information, the each object data 103 may further comprise an occupancy sequence 105 indicating the spatial occupancy of the successional sub-regions 501 of a respective at least partially occupied interval 520. The (at least) partially occupied intervals are illustrated in FIG. 5c, being a graphical illustration of partially occupied intervals 520 indicating a spatial occupancy of the sub-regions 501 based on the linear order of the sub-regions 501 in the spatial region 500. The occupancy sequence 105 is for example stored and in FIG. 1 illustrated as a BLOB. The object data 103 of each entry 102 may thus have the structure (minValue, maxValue, occupancy sequence), that is in above example <(2, 7), (111101)>, <(12, 18), (1001001)>, <(22, 29), (11111111)>, <(36, 42), (1001001)> and <(46, 47), (11)>. The successional sub-regions of the at least partially occupied intervals 520 comprise not more than a maximum number (in this example the maximum number is 2) of consecutive spatially vacant sub-regions.

The "minValue" and "maxValue" in each case store the lower and upper interval border of the corresponding interval. The occupancy sequence in each case contains a bit stream of "0" and "1" voxel values stored as a BLOB.

In this example, the object data set 101 is a global object data set. The spatial region to which the object data set pertains to and the geographical region to which the navigation data sets pertain to are at least partially identical. In other words, the object data for the navigation data sets 120 is centrally stored in the global object data set 101. However, it is also possible to associate a (local) object data set with (e.g. store together with or insider) each navigation data set 120. The object data for a navigation data set 120 is then locally stored together with or in the corresponding navigation data set 120.

Each entry 102 of the object data set 101 of the navigation data source 100 further comprises identifiers 106, in this example an object identifier "ObjectID" and a tile identifier "TileID". The object identifier may identify the structural object or a class thereof. The tile identifier may identify the tile data set (which may be a navigation data set 120 or a part thereof) pertaining to the relevant geographic region overlapping with or comprising the spatial region to which the object data of the respective entry 102 pertains.

The navigation data source 100 further comprises index data 130. In one example, the index data 130 may also part of the object data set 101. The index data 130 indexes at least a part of the object data 103 and/or one or more of the identifiers 106. The index data 130 is preferably based on a tree structure, in particular a B-tree (e.g. for an identifier) or an RI-tree (e.g. for interval information).

Figure 2:
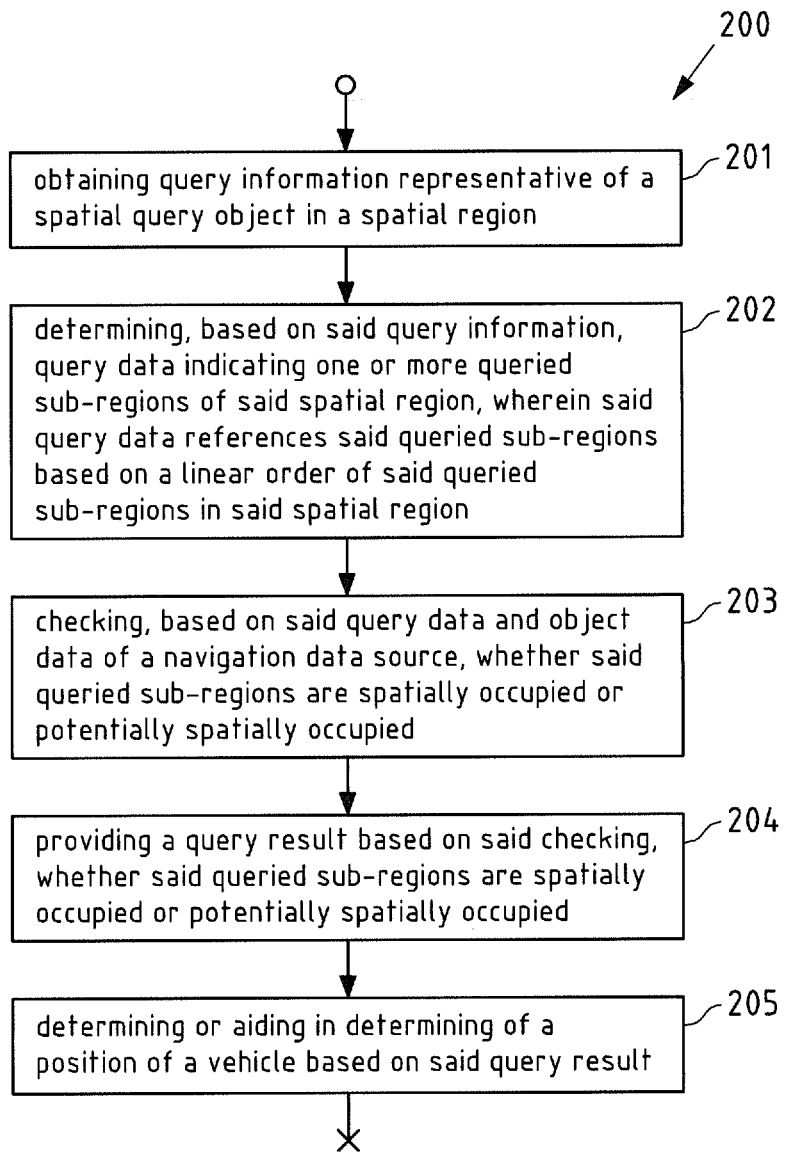
FIG. 2 is a flow chart illustrating an exemplary embodiment of a method according to the second aspect of the invention.

Turning now to FIG. 2, a query process for retrieving data from the navigation data source is now described. FIG. 2 shows a flow chart 200 illustrating an exemplary embodiment of a method according to the second aspect of the invention is depicted.

First, query information representative of a spatial query object in a spatial region is obtained (action 201).

Based on the query information, query data is determined (action 202). The query data indicates one or more queried sub-regions of the spatial region. As explained with respect to the object data, also the query data references the queried sub-regions based on a linear order of the queried sub-regions in the spatial region. FIG. 1a exemplarily illustrates query data 150 comprising query interval information 151 about one or more (at least partially) queried intervals. The query data 120 may further comprise a query sequence 152 for each partially queried interval, indicating queried sub-regions of the at least partially queried interval.

Based on the query data 150 and object data 103 of the navigation data source 100 it is checked, whether the queried sub-regions are spatially occupied or potentially spatially occupied (action 203).

Based on the index data 130 indexing the object data 103, it can be quickly determined whether one or more (partially) queried intervals of the query data overlap with (partially) occupied intervals of the object data 103. A first preliminary query result may be provided at this time. The preliminary query result may be used for the next step.

Based on the general interval properties, the checking may also comprise determining, whether one or more (partially) queried intervals comprise queried sub-regions, which are spatially occupied. For this, the available first preliminary query result may be used. A second preliminary query result may be provided at this time. The preliminary query result may be used for the next step.

Based on one or more query sequences 152 of the query data 150 and one or more occupancy sequences 105 of object data 103, the checking may further comprise determining, which queried sub-regions are spatially occupied. For this, the available first and/or second preliminary query result may be used. At this time a final query result may be provided (action 204).

The query result is then used for determining or for aiding in determining of a position of a vehicle (action 205).

Figure 3:
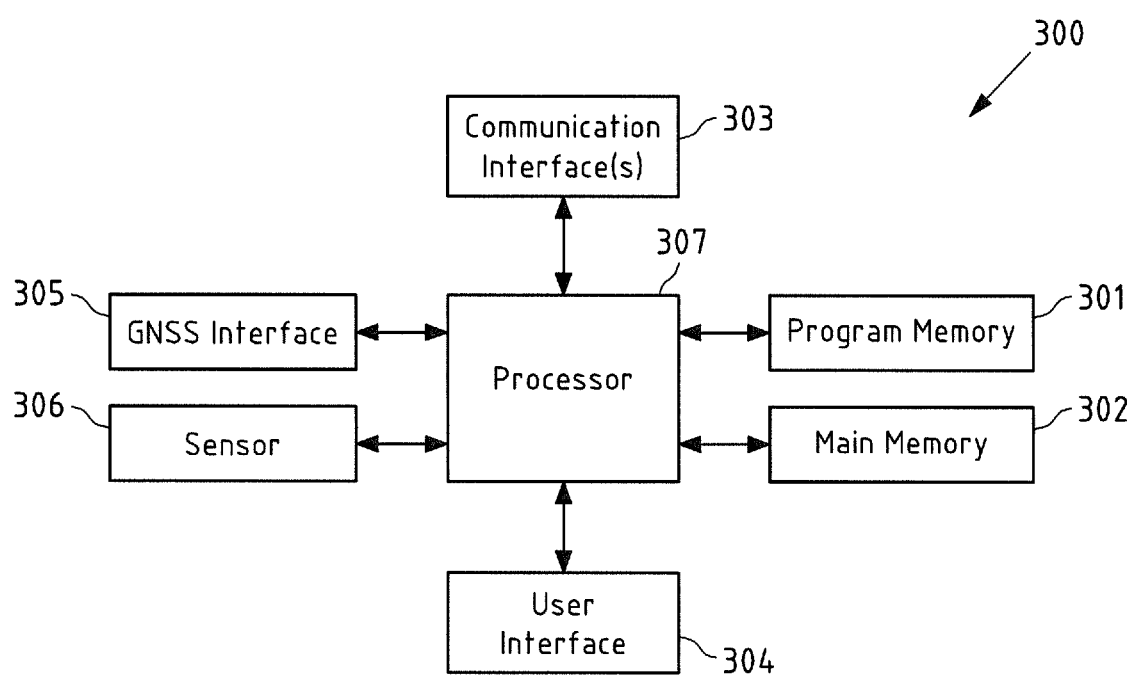
FIG. 3 is a block diagram illustrating an exemplary embodiment of an apparatus according to the second aspect of the invention.

The described method may be performed by one or more apparatuses. A block diagram illustrating an exemplary embodiment of an apparatus is shown in FIG. 3.

For instance, the apparatus 300 is or forms a part (e.g. as a module) of a data processing device, which may be part of a vehicle. The apparatus 300 comprises a processor 307. Processor 307 may represent a single processor or two or more processors, which are for instance at least partially coupled, for instance via a bus. Processor 307 executes a program code stored in program memory 301 (for instance program code causing apparatus 307 to perform embodiments of the method (or parts thereof) according to the second aspect of the invention, when executed on processor 307), and interfaces with a main memory 302. Some or all of memories 301 and 302 may also be included into processor 307. One of or both of memories 301 and 302 may be fixedly connected to processor 307 or at least partially removable from processor 307, for instance in the form of a memory card or stick. Program memory 301 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 301 may also comprise an operating system for processor 307. Program memory 301 may for instance comprise a first memory portion that is fixedly installed in the apparatus 300, and a second memory portion that is removable from apparatus 300, for instance in the form of a removable SD memory card. Navigation data source 100 may for instance be stored in program memory 301. Main memory 302 may for instance be a volatile memory. It may for instance be a RAM or DRAM memory, to give but a few non-limiting examples. It may for instance be used as a working memory for processor 307 when executing an operating system and/or programs.

Processor 307 further controls a communication interface 303 configured to receive and/or output information. For instance, navigation data source 100 or a part thereof may be downloaded to apparatus 300 by means of the communication interface 303. The navigation data source 100 or the part thereof may be provided by a remote server, for example. In embodiments of the invention, communication interface 303 is inter alia configured to allow communication according to a 2G/3G/4G/5G cellular communication system and/or a non-cellular communication system, such as for instance a WLAN network. Nevertheless, the communication route between apparatus 300 and a remote server may equally well at least partially comprise wire-bound portions.

Processor 307 further controls a user interface 304 configured to present information to a user of apparatus 300 and/or to receive information from such a user (e.g. a driver or passenger of a vehicle). User interface 304 may for instance be the standard user interface via which a user of apparatus 300 also controls other functionality thereof.

Processor 307 may further control a GNSS interface 305 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS).

The apparatus 300 may further comprise a sensor 306. The sensor 306 may be used for obtaining environmental information in the environment of a vehicle, for example. The obtained environmental information may indicate a spatial vacancy and/or occupancy of sub-regions by one or more structural objects in the environment of the vehicle. Based on the query result (which may allow for building an environmental model of the environment) and the environmental information obtained via sensor 306, e.g. by comparing the query result (or the obtained environmental model) with the environmental information, the determination of a position of the vehicle may be performed or aided.

The components 301-306 of apparatus 300 may for instance be connected with processor 307 by means of one or more serial and/or parallel busses.

Figure 6:
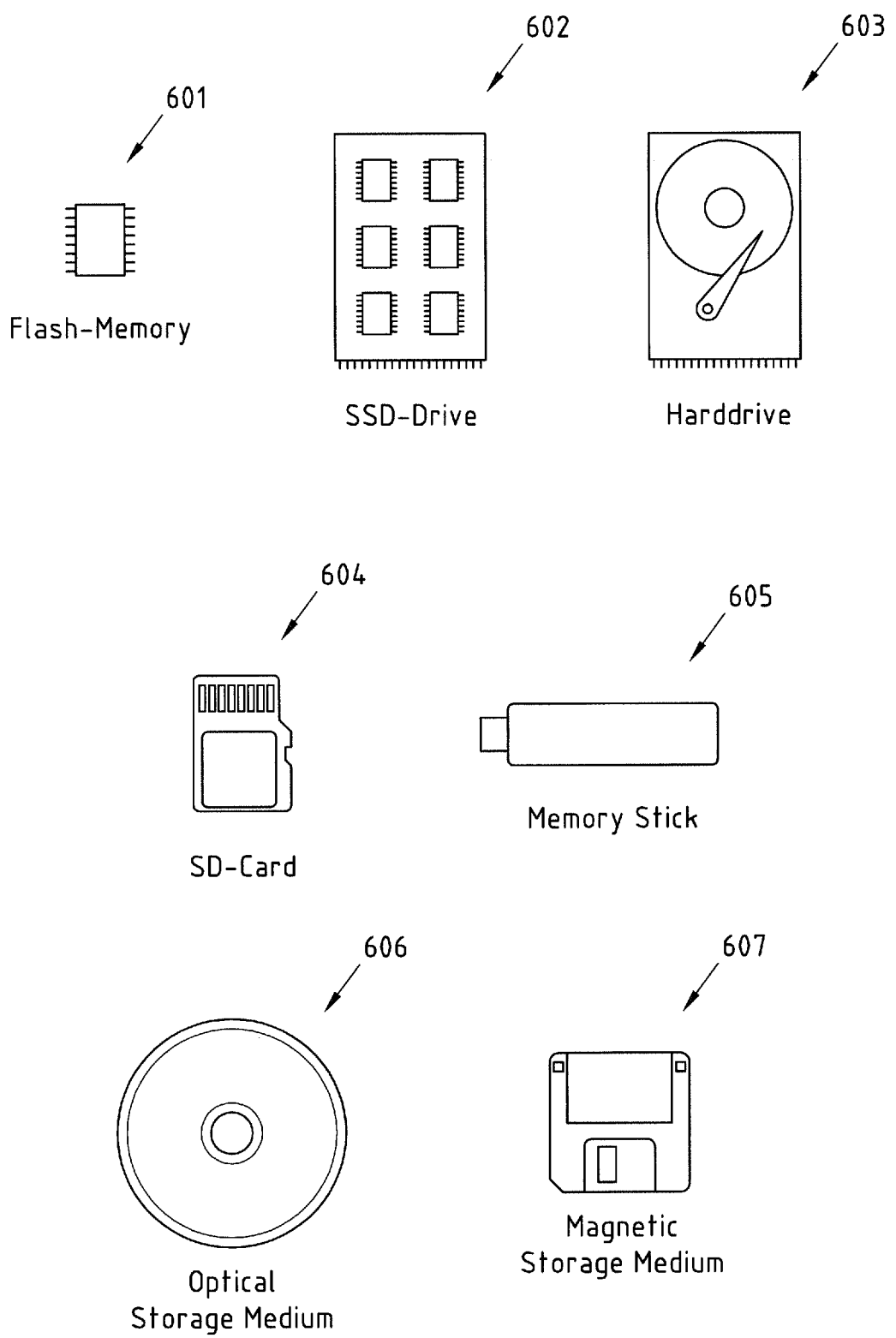
FIG. 6 is a schematic illustration of examples of tangible storage media according to the first or second aspect.

FIG. 6 is a schematic illustration of examples of tangible storage media according to the first or second aspect, that may for instance be used to implement program memory 301 of FIG. 3. To this end, FIG. 6 displays a flash memory 601, which may for instance be soldered or bonded to a printed circuit board, a solid-state drive 602 comprising a plurality of memory chips (e.g. Flash memory chips), a magnetic hard drive 603, a Secure Digital (SD) card 604, a Universal Serial Bus (USB) memory stick 605, an optical storage medium 606 (such as for instance a CD-ROM or DVD) and a magnetic storage medium 607.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 307 of FIG. 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus comprising:
   a processor, and
   a memory connectively coupled to the processor wherein the memory stores a navigation data source, the navigation data source including:
      an object data set, said object data set comprising object data,
   wherein said object data indicates a spatial vacancy and/or occupancy of sub-regions of a spatial region by one or more structural objects in said spatial region with a first resolution in a first dimension, a second resolution in a second dimension and a third resolution in a third dimension;
   wherein said object data references said sub-regions based on a linear order of said sub-regions in said spatial region with at least one of the first, second or third resolutions being different than the other resolutions, and
   wherein said navigation data source transmits said object data for providing navigation.

2. The navigation data source according to claim 1, wherein said linear order is based on a space filling curve through said spatial region linearly ordering said sub-regions of said spatial region.

3. The navigation data source according to claim 2, wherein said space filling curve is a Z-order curve.

4. The navigation data source according to claim 1, wherein said spatial region is a three dimensional region, and
   wherein said linear order allows for a one dimensional ordering of said sub-regions of said spatial region.

5. The navigation data source according to claim 1, wherein said object data uses voxels associated with said sub-regions of said spatial region, wherein a value of a respective voxel indicates a spatial vacancy and/or occupancy of a respective sub-region by said one or more structural objects in said spatial region.

6. The navigation data source according to claim 1, wherein preferably said third resolution in said third dimension is smaller than said first resolution in said first dimension and/or said second resolution in said second dimension.

7. The navigation data source according to claim 1, wherein said object data comprises an occupancy sequence indicating a spatial vacancy and/or occupancy of sub-regions of said spatial region.

8. The navigation data source according to claim 1, wherein said object data comprises interval information about an occupied interval, in particular a lower interval border and/or an upper interval border, said occupied interval indicating a group of one or more, according to said linear order, successional sub-regions, which are spatially occupied.

9. The navigation data source according to claim 1, wherein said object data comprises interval information about an at least partially occupied interval, in particular a lower interval border and/or an upper interval border, said at least partially occupied interval indicates a group of, according to said linear order, one or more successional sub-regions, at least a part of which are spatially occupied, and wherein said object data comprises an occupancy sequence indicating a spatial vacancy and/or occupancy of said successional sub-regions of said at least partially occupied interval.

10. The navigation data source according to claim 9, wherein said successional sub-regions of said at least partially occupied interval comprise not more than a maximum number of consecutive spatially vacant sub-regions.

11. The navigation data source according to claim 1, wherein said object data set comprises multiple entries, wherein each of said entries comprises:
one or more identifiers, in particular an object identifier and/or a navigation data set identifier; and
object data, in particular comprising interval information and/or an occupancy sequence.

12. The navigation data source according to claim 11, wherein each of said entries pertains to one occupied or at least partially occupied interval.

13. The navigation data source according to claim 1, wherein said one or more structural objects comprise roads, road objects, and/or roadside objects.

14. The navigation data source according to claim 1, said navigation data source further comprising:
a navigation data set representing a map of a geographic region, said navigation data set and said object data set pertaining at least in part to the same region.

15. The navigation data source according to claim 1, wherein said navigation data source comprises index data indexing at least a part of said object data, in particular interval information, and/or an identifier, in particular a navigation data set identifier.

16. The navigation data source according to claim 15, wherein said index data is based on a tree structure, in particular a B-tree or a RI-tree.

17. A method, performed by at least one apparatus, said method comprising:
obtaining query information representative of a spatial query object in a spatial region;
determining, based on said query information, query data indicating one or more queried sub-regions of said spatial region, wherein said query data references said queried sub-regions based on a linear order of said queried sub-regions in said spatial region; and
checking, based on said query data and object data of a navigation data source, whether said queried sub-regions are spatially occupied or potentially spatially occupied, wherein said object data indicates a spatial vacancy and/or occupancy of sub-regions of said spatial region by one or more structural objects in said spatial region with a first resolution in a first dimension, a second resolution in a second dimension and a third resolution in a third dimension, and wherein said object data references said sub-regions based on a linear order of said sub-regions in said spatial region with at least one of the first, second or third resolutions being different than the other resolutions.

18. The method according to claim 17, said method further comprising:
providing a query result based on said checking, whether said queried sub-regions are spatially occupied or potentially spatially occupied.

19. The method according to claim 18, wherein said query result indicates whether said queried sub-regions are spatially occupied.

20. The method according to claim 18, wherein said query result indicates one or more structural objects at least partially overlapping with said spatial query object.

21. The method according to claim 18, said method further comprising:
determining or aiding in determining of a position of a vehicle based on said query result.

22. The navigation data source according to claim 17, wherein said query data comprises a query sequence indicating queried sub-regions of said spatial region.

23. The method according to claim 17, wherein said determined query data comprises query interval information about a queried interval, in particular a lower query interval border and/or an upper query interval border, said query interval indicating a group of one or more, according to said linear order, successional sub-regions, which are queried.

24. The method according to claim 17, wherein said determined query data comprises query interval information about an at least partially queried interval, in particular a lower query interval border and/or an upper query interval border, said at least partially queried interval indicates a group of, according to said linear order, one or more successional sub-regions, at least a part of which are queried, and
wherein said query data comprises a query sequence indicating queried sub-regions of said at least partially queried interval.

25. The method according to claim 17, wherein said checking, whether said queried sub-regions are spatially occupied or potentially spatially occupied, is based on one or more of the following:
index data indexing at least a part of said object data; general interval properties; and/or
one or more query sequences of said query data and one or more occupancy sequences of object data.

26. The method according to claim 17, said method further comprising:
determining at least one navigation data set or a part thereof associated with an object data set potentially relevant for said checking, whether said queried sub-regions are spatially occupied or potentially spatially occupied.

27. A non-transitory computer readable storage medium storing computer program code, said computer program code when executed by a processor causing an apparatus to:
obtain query information representative of a spatial query object in a spatial region;
determine, based on said query information, query data indicating one or more queried sub-regions of said spatial region, wherein said query data references said queried sub-regions based on a linear order of said queried sub-regions in said spatial region; and
check, based on said query data and object data of a navigation data source, whether said queried sub-regions are spatially occupied or potentially spatially occupied, wherein said object data indicates a spatial vacancy and/or occupancy of sub-regions of said spatial region by one or more structural objects in said spatial region with a first resolution in a first dimension, a second resolution in a second dimension and a third resolution in a third dimension, and wherein said object data references said sub-regions based on a linear order of said sub-regions in said spatial region with at least one of the first, second or third resolutions being different than the other resolutions.

28. A non-transitory computer readable storage medium storing a navigation data source comprising an object data set, said object data set comprising object data that indicates a spatial vacancy and/or occupancy of sub-regions of a spatial region by one or more structural objects in said spatial region with a first resolution in a first dimension, a second resolution in a second dimension and a third resolution in a third dimension; wherein said object data references said sub-regions based on a linear order of said sub-regions in said spatial region with at least one of the first, second or third resolutions being different than the other resolutions; and wherein said navigation data source transmits said object data for providing navigation.

29. An apparatus comprising
    means for obtaining query information representative of a spatial query object in a spatial region;
    means for determining, based on said query information, query data indicating one or more queried sub-regions of said spatial region, wherein said query data references said queried sub-regions based on a linear order of said queried sub-regions in said spatial region; and
    means for checking, based on said query data and object data of a navigation data source, whether said queried sub-regions are spatially occupied or potentially spatially occupied, wherein said object data indicates a spatial vacancy and/or occupancy of sub-regions of said spatial region by one or more structural objects in said spatial region with a first resolution in a first dimension, a second resolution in a second dimension and a third resolution in a third dimension, and wherein said object data references said sub-regions based on a linear order of said sub-regions in said spatial region with at least one of the first, second or third resolutions being different than the other resolutions.

30. An apparatus comprising at least one processor and at least one memory including computer program code, said at least one memory and said computer program code configured to, with said at least one processor, cause an apparatus at least to:
    obtain query information representative of a spatial query object in a spatial region;
    determine, based on said query information, query data indicating one or more queried sub-regions of said spatial region, wherein said query data references said queried sub-regions based on a linear order of said queried sub-regions in said spatial region; and
    check, based on said query data and object data of a navigation data source, whether said queried sub-regions are spatially occupied or potentially spatially occupied, wherein said object data indicates a spatial vacancy and/or occupancy of sub-regions of said spatial region by one or more structural objects in said spatial region with a first resolution in a first dimension, a second resolution in a second dimension and a third resolution in a third dimension, and wherein said object data references said sub-regions based on a linear order of said sub-regions in said spatial region with at least one of the first, second or third resolutions being different than the other resolutions.

* * * * *

UNITED STATES PATENT AND TRADEMARK OFFICE
CERTIFICATE OF CORRECTION

| | |
|---|---|
| PATENT NO. | : 11,157,531 B2 |
| APPLICATION NO. | : 16/461835 |
| DATED | : October 26, 2021 |
| INVENTOR(S) | : Pfeifle |

It is certified that error appears in the above-identified patent and that said Letters Patent is hereby corrected as shown below:

In the Claims

Column 20,
Line 30, in Claim 2, "navigation data source" should read --apparatus--;
Line 33, in Claim 2, at the end of the claim, insert --with said first resolution in said first dimension, said second resolution in said second dimension and said third resolution in said third dimension--;
Line 34, in Claim 3, "navigation data source" should read --apparatus--;
Line 36, in Claim 4, "navigation data source" should read --apparatus--;
Line 41, in Claim 5, "navigation data source" should read --apparatus--;
Line 47, in Claim 6, "navigation data source" should read --apparatus--;
Line 48, in Claim 6, "wherein preferably said" should read --wherein said--;
Line 52, in Claim 7, "navigation data source" should read --apparatus--;
Line 56, in Claim 8, "navigation data source" should read --apparatus--;
Line 63, in Claim 9, "navigation data source" should read --apparatus--.

Column 21,
Line 8, in Claim 10, "navigation data source" should read --apparatus--;
Line 13, in Claim 11, "navigation data source" should read --apparatus--;
Line 20, in Claim 12, "navigation data source" should read --apparatus--;
Line 23, in Claim 13, "navigation data source" should read --apparatus--;
Line 26, in Claim 14, "navigation data source" should read --apparatus--;
Line 32, in Claim 15, "navigation data source" should read --apparatus--;
Line 37, in Claim 16, "navigation data source" should read --apparatus--.

Signed and Sealed this
Eleventh Day of October, 2022

Katherine Kelly Vidal
*Director of the United States Patent and Trademark Office*